No. 737,681. PATENTED SEPT. 1, 1903.
J. B. WARING.
VALVE.
APPLICATION FILED JULY 1, 1901. RENEWED FEB. 4, 1903.
NO MODEL. 3 SHEETS—SHEET 2.
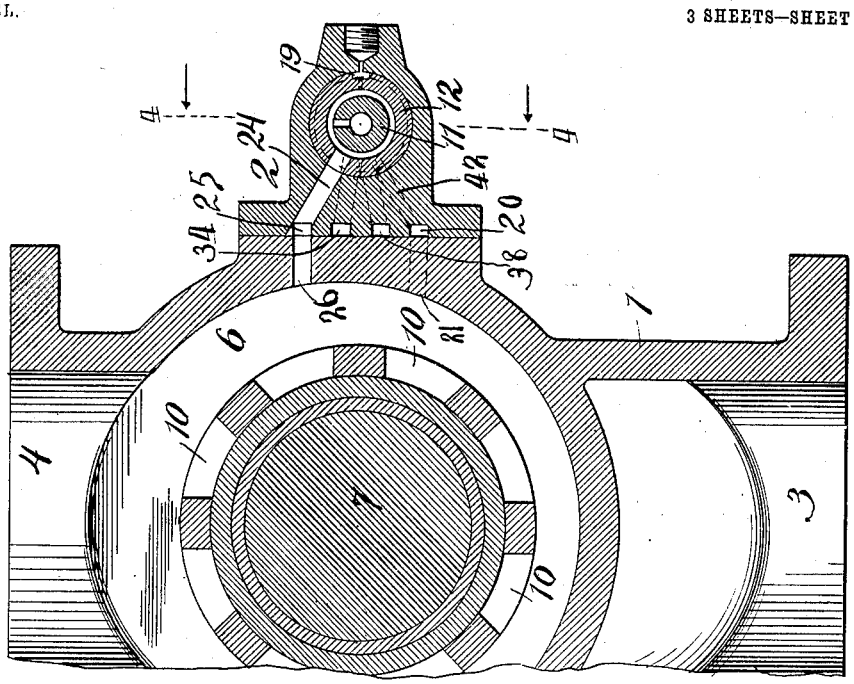
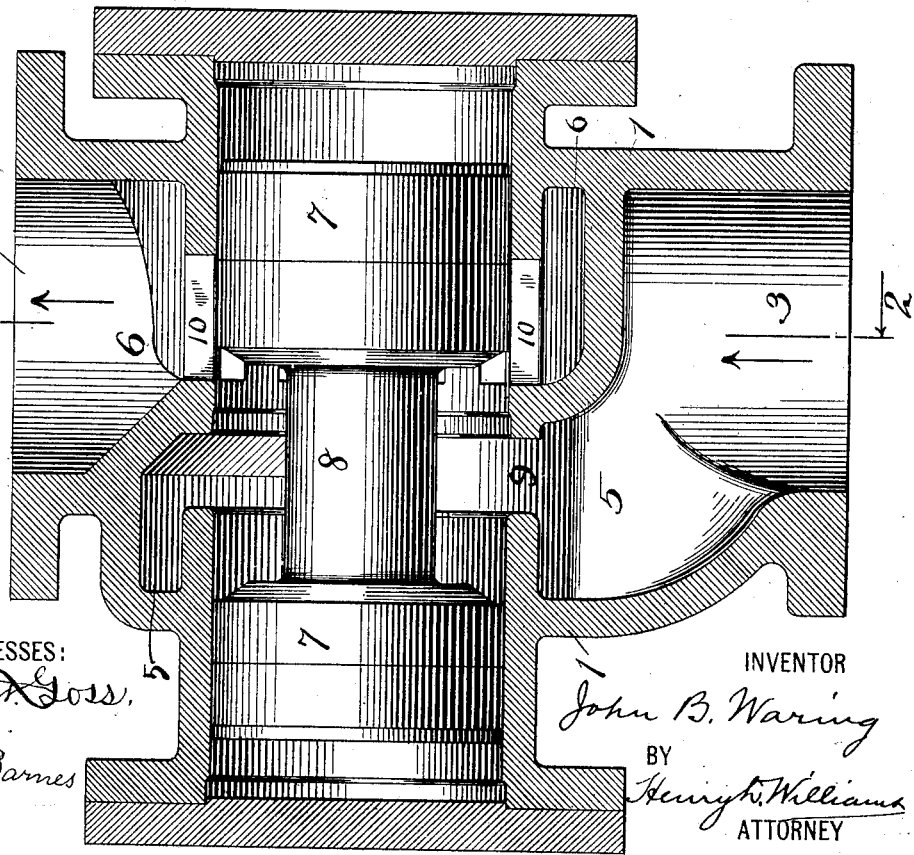
WITNESSES:
Harry Goss
Henry Barnes
INVENTOR
John B. Waring
BY
Henry L. Williams
ATTORNEY No. 737,681. PATENTED SEPT. 1, 1903.
J. B. WARING.
VALVE.
APPLICATION FILED JULY 1, 1901. RENEWED FEB. 4, 1903.
NO MODEL. 3 SHEETS—SHEET 3.

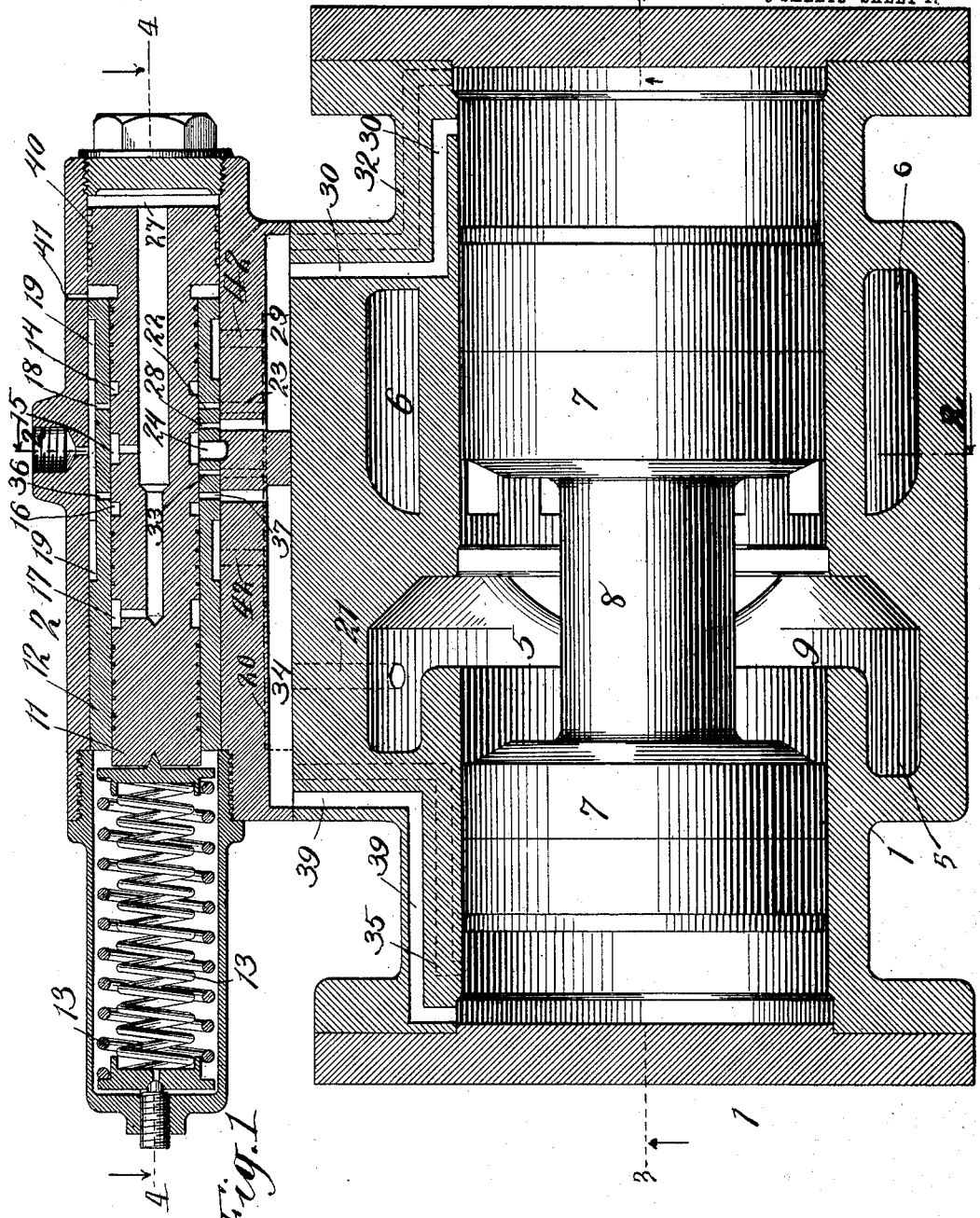

WITNESSES:
Harry Goss.
Henry Barnes.

INVENTOR
John B. Waring
BY
Henry D. Williams
ATTORNEY

No. 737,681. Patented September 1, 1903.

UNITED STATES PATENT OFFICE.

JOHN B. WARING, OF EAST ORANGE, NEW JERSEY, ASSIGNOR, BY MESNE ASSIGNMENTS, TO WARING PATENTS COMPANY, OF NEW YORK, N. Y., A CORPORATION OF NEW YORK.

VALVE.

SPECIFICATION forming part of Letters Patent No. 737,681, dated September 1, 1903.

Application filed July 1, 1901. Renewed February 4, 1903. Serial No. 141,931. (No model.)

*To all whom it may concern:*

Be it known that I, JOHN B. WARING, a citizen of the United States, and a resident of East Orange, Essex county, State of New Jersey, have invented new and useful Improvements in Valves, of which the following is a specification, reference being had to the accompanying drawings, forming part thereof.

This invention relates to valves adapted for the regulation or reduction of pressures and for controlling the flow of a fluid from a high pressure to a low pressure and so regulating the flow of the fluid as to produce a uniform predetermined low pressure or pressure beyond the valve. My invention consists in the provision of improved means whereby such a valve is actuated in both directions by fluid from in advance of the valve, the admission and exhaustion of which is controlled by the fluid-pressure beyond the valve.

My invention further consists in the provision in such a valve of valve-actuating chambers for actuating the valve in both directions, with connections for admitting and exhausting fluid from both of such actuating-chambers, and a governing device controlled by the low-pressure fluid and controlling the connections to such valve-actuating chambers.

My invention further consists in the provision of a reciprocating valve having a fluid-passage and coöperating with openings in the casing to control the flow of the fluid and actuated by pressure against the ends of the reciprocating valve, and, further, in the provision of means for cushioning the movement of such valve.

My invention further consists in various improvements in construction and combinations of parts.

I will now describe the construction of the valve embodying my invention, illustrated in the accompanying drawings, and will thereafter point out my invention in claims.

Figure 4:
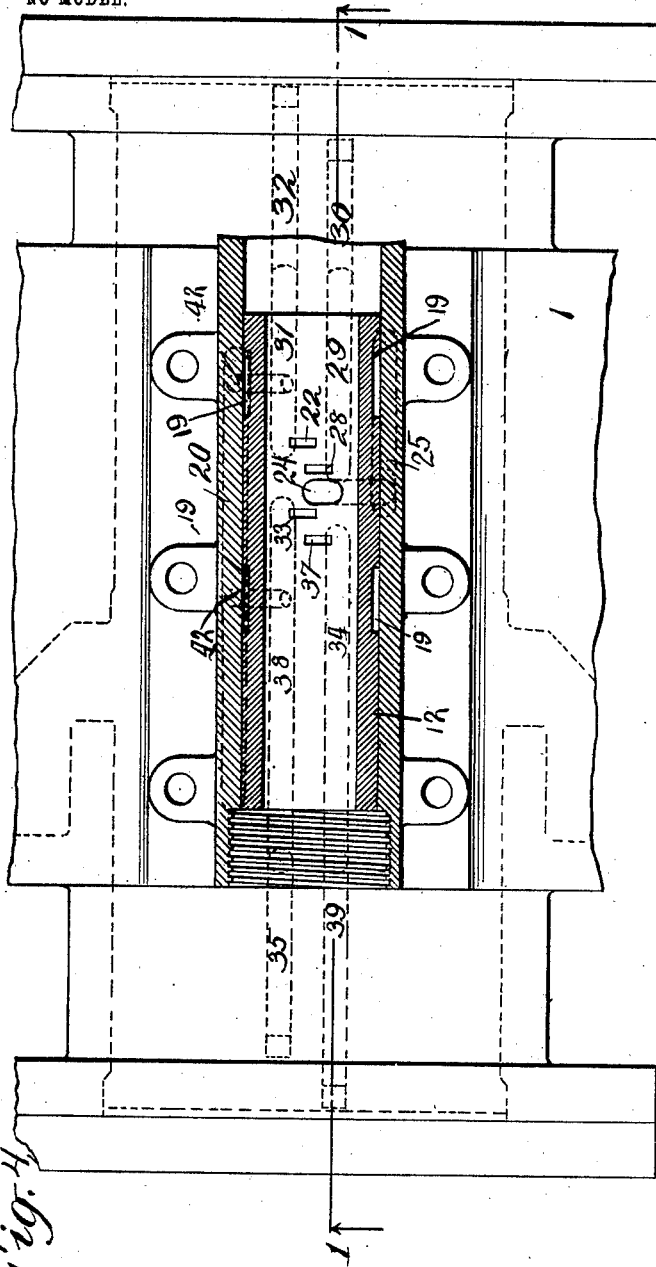
Figure 5:
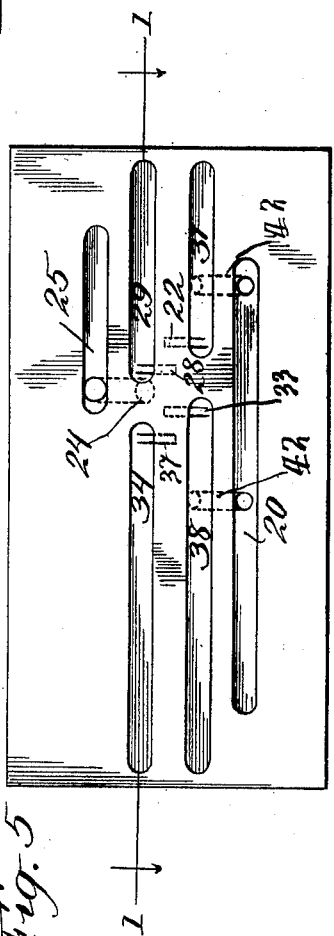

Figure 1 is a longitudinal central section of a valve embodying my invention on the line 1 1 of Figs. 4 and 5. Fig. 2 is a section of the same on the line 2 2 of Fig. 1. Fig. 3 is a longitudinal section of the same on the line 3 3 of Fig. 1. Fig. 4 is a longitudinal section on the line 4 4 of Figs. 1 and 2, with the governing-valve and other parts removed. Fig. 5 is a bottom view of the cap or upper chest containing the regulating and controlling device and showing the various pressure-passages.

Referring to the drawings, the casing shown consists of two castings 1 2 suitably secured together, which contain all the operative parts of the valve. The large casting 1 contains the inlet 3 and outlet 4 for the fluid and the high-pressure chamber 5 and the low-pressure chamber 6, and also contains the main valve 7. The main valve is a reciprocating valve, having a passage therein for the fluid, and is shown as a piston reciprocating in a cylinder formed in the casing, and the passage for the fluid is in the form of a circumferential groove on the cylinder, so that the valve is in the form of a double or tandem piston, the two parts of the piston being joined by a connecting portion 8 of reduced diameter. The high-pressure chamber 5 is shown as located in the left-hand portion of the casing, and the low-pressure chamber 6 is shown as located in the right-hand portion of the casing, and an opening or circumferential port 9 leads from the high-pressure chamber to the circumferential groove of the main valve 7 and is so arranged that this passage is open in all positions of the valve. Ports 10 are provided, leading from the valve-cylinder into the low-pressure chamber, and the opening of these ports is varied or entirely closed by the movements of the main valve. The cylinder in which the piston 7 reciprocates provides at its ends additional chambers between the ends of the piston and the ends of the cylinder, in which the piston-valve is actuated in both directions by pressure of the fluid against its ends, the admission and exhaustion of the fluid being controlled automatically.

The controlling or governing device comprises a reciprocating piston-valve 11, fitted in a chamber having a bushing 12, and a pressure-resisting device (shown as a double-coiled spring 13) bears against one end of the reciprocating governing-valve 11, and the low pressure is admitted to press against the valve in opposition to the pressure of the resisting device. The governing-valve 11 is provided with circumferential grooves 14, 15, 16, and 17, arranged along the length of the valve and with packing or oil grooves between them. The right-hand end circumferential groove 14 is a high-pressure groove and coöperates with a port 18, connected by an annular passage 19 and two connecting-passages 42 42, with a longitudinal groove 20 in the abutting face, where the two castings of the casing are joined together, this longitudinal groove being connected by a passage 21 to the high-pressure chamber 5. Another port, 22, oppositely arranged to the port 18, receives the high pressure by way of the circumferential groove 14 and delivers it through a passage 23, leading to a longitudinal groove 31, connected by a passage 32 to the right-hand end of the chamber or cylinder of the main valve 7, and the function of the port 14 is to supply high-pressure fluid to actuate the main valve in the direction required for closing the ports leading into the low-pressure chamber. The circumferential groove 15 of the governing-valve is of sufficient length to coöperate in all positions with the port and passage 24, leading from the longitudinal groove 25, which receives fluid through the passage 26 from the low-pressure chamber 6, (see Fig. 2,) and one or more passages are formed from this circumferential groove 15 through a longitudinal passage 27, located centrally in the governing-valve and leading out through the right-hand end of the governing-valve, so as to convey the low-pressure fluid for actuating the governing-valve. The circumferential groove 15 also opens when in its extreme right-hand position a port and passage 28, leading to a longitudinal groove 29, connected by a passage 30 to the cylinder or chamber of the main valve and with its port located at a distance from the end of the cylinder or chamber, the function of these ports and passages being to exhaust the fluid from the right-hand end of the main-valve cylinder or chamber, and the location of the port in such cylinder or chamber insuring the cutting off of this exhaust before the main valve reaches its extreme right-hand position, whereby a portion of the fluid is trapped in the cylinder or chamber to cushion the action of the main valve. Another port and passage, 33, in the casing is located so as to coöperate with the circumferential groove 15 when the governing-valve is in extreme left-hand position, and this port and passage lead from a longitudinal groove 38, which is connected by passage 35 to the chamber or cylinder for the main valve at the left hand thereof, its port terminating at a distance from the end of the chamber or cylinder and performing a similar function to the port and passage 30—that is to say, exhausting the fluid from the cylinder and permitting a trapping of a portion of the fluid and a cushioning action. The circumferential groove 16 on the governing-valve coöperates with the port 36, supplied with high-pressure fluid from the annular passage 19, and this circumferential groove 16 also coöperates with a port and passage 37, leading to a longitudinal groove 34, which is connected by a passage and port 39 to the cylinder or chamber of the main valve, at the left-hand end thereof, to supply high-pressure fluid to actuate the main valve. The circumferential groove 17 is a leakage-groove to receive any of the high-pressure fluid which may pass thereto from the high-pressure circumferential groove 16 and to convey the same to the longitudinal passage in the governing-valve, so that such leakage, if any, is carried to the low pressure and does not escape into the atmosphere.

The drawings illustrate the governing-valve in middle position with all ports closed except the port 24, conveying the low-pressure fluid to actuate the governing-valve. Such a balanced condition would occur in the operation of the valve when the opening of the low-pressure ports was such as to supply the predetermined low pressure. Should the low pressure fall below that required, the governing-valve 11 would be moved to the right and would first open the left-hand end of the main valve to the high pressure at the circumferential groove 16, and thereby the high-pressure fluid would be supplied to move the main valve to the right or in the direction required for increasing the opening at the regulating-ports 10, and a slight further movement to the right would also open the exhaust-port at the right-hand end of the cylinder of the main valve to permit the fluid at the right of the main valve to exhaust to the low-pressure side. When the opening had been sufficiently increased to bring the low pressure up to the normal and predetermined point, the governing-valve would be again moved to the left against the resistance of the spring 13 and the ports just opened would be again closed. Should the low pressure rise above the normal or predetermined pressure, the governing-valve would be moved farther to the left and would open the high pressure to the right-hand end of the main valve through the circumferential groove 14 and the exhaust from the left-hand end of the main valve through the circumferential groove 15, and the main valve would be moved to the left or in the direction required for closing the regulating-ports, and this would be continued until the diminution of the low pressure caused retrograde movement of the governing-valve.

For the purpose of increasing the actuating force of the governing-valve without magnifying the dimensions of the ported portions thereof I provide a piston or enlargement 40 at the right-hand end of this valve and connect the chamber at the left-hand end of this piston with the atmosphere by the passage 41, so as to permit the piston to be freely actuated by the low pressure.

It is obvious that various modifications may be made in the construction above particularly described within the spirit and scope of my invention.

What I claim, and desire to secure by Letters Patent, is—

1. A pressure-reducing valve comprising a casing having a high-pressure chamber and a low-pressure chamber, a valve controlling the passage of fluid from the high-pressure chamber to the low-pressure chamber, the casing being also provided with additional chambers at the ends of the valve wherein the valve is actuated in both directions by fluid from the high-pressure chamber and with pressure and exhaust connections for such additional chambers, and a governing device controlled by the low pressure and controlling at such pressure and exhaust connections the admission and exhaustion of the high-pressure fluid to and from the additional chambers.

2. A pressure-reducing valve comprising a casing having a high-pressure chamber and a low-pressure chamber, a piston-valve controlling the passage of fluid from the high-pressure chamber to the low-pressure chamber, the casing being also provided with additional chambers one at each end of the piston-valve wherein the piston-valve is actuated in both directions by fluid from the high pressure acting against the ends thereof and with pressure and exhaust connections for such additional chambers, and a governing device controlled by the low pressure and controlling at such pressure and exhaust connections the admission and exhaustion of the high-pressure fluid to and from the additional chambers.

3. A pressure-regulating valve comprising a casing, a reciprocating valve in the casing having a fluid-passage and coöperating with openings in the casing to control the flow of a fluid, the casing having chambers formed therein at each end of the reciprocating valve, and means controlled by the pressure beyond the valve and controlling the admission of fluid from in advance of the valve to such chambers to actuate the valve in both directions by pressure of such fluid against the ends thereof and controlling the exhaustion of such fluid.

4. A pressure-reducing valve comprising a casing, a reciprocating valve in the casing having a fluid-passage and coöperating with openings in the casing to control the flow of a fluid from a high pressure to a low pressure, the casing having chambers at the ends of such reciprocating valve, and a governing-valve controlled by the fluid at the low-pressure side of the reciprocating valve, the casing having pressure and exhaust ports with which such governing-valve coöperates to admit fluid from the high-pressure side of the reciprocating valve to such chambers to actuate the reciprocating valve in both directions by pressure of such fluid at its ends and to exhaust such fluid to the low-pressure side of the reciprocating valve.

5. A pressure-reducing valve comprising a casing, a reciprocating main valve in the casing having a fluid-passage and coöperating with openings in the casing to control the flow of fluid from a high pressure to a low pressure, a reciprocating governing-valve having passages and coöperating with ports in the casing to admit the fluid from the low-pressure side of the main valve to actuate the governing-valve in one direction and a resisting device opposed to such pressure, the passages of the governing-valve and ports in the casing being constructed to control the admission of fluid from the high-pressure side of the main valve to actuate the main valve in both directions by pressure of such fluid at its ends and to exhaust such fluid to the low-pressure side of the main valve.

6. A pressure-reducing valve comprising a casing, a reciprocating main valve in the casing having a fluid-passage and coöperating with openings in the casing to control the flow of fluid from a high pressure to a low pressure, a reciprocating governing piston-valve having circumferential grooves coöperating with ports in the casing to convey fluid from the high-pressure side of the main valve to actuate the main valve by pressure at the ends thereof and having a circumferential groove coöperating with ports in the casing to exhaust such fluid to the low-pressure side of the main valve, and having a passage therein leading to one end thereof to supply fluid from the low-pressure side of the main valve to actuate the governing-valve in one direction, and means for conveying leakage from the high-pressure grooves to the low pressure, and a resisting device for actuating the governing-valve in the other direction.

7. In a pressure-reducing valve, the combination, with a casing having a cylinder therein, of a reciprocating piston-valve in the cylinder provided with a circumferential groove, the casing having an opening leading the high pressure to such circumferential groove and ports leading from such groove to the low-pressure side of the piston-valve, and controlled by the movement of the piston-valve and the casing having chambers at the ends of the piston-valve, and means controlled by pressure at the low-pressure side of the piston-valve for actuating the piston-valve from the high-pressure side thereof by pressure exerted in such chambers against the ends of the valve.

8. In a pressure-regulating valve, the combination, with a casing, of a reciprocating valve in the casing having a fluid-passage and coöperating with openings in the casing to control the flow of fluid, the casing having inlets leading to each end of the reciprocating valve for supplying fluid to actuate the valve, and the casing having outlets leading from points at a distance from the ends of the valve-chamber, whereby a portion of the fluid is trapped to cushion the movement of the reciprocating valve.

9. In a pressure-reducing valve, the combination, with a casing, of a reciprocating valve in the casing having a fluid-passage and cooperating with openings in the casing to control the flow of fluid from a high pressure to a low pressure, the casing having inlets leading to each end of the reciprocating valve and outlets leading from points at a distance from the ends of the valve-chamber, and a governing device controlled by the pressure at the low-pressure side of the valve and controlling the admission of fluid through such inlets from the high-pressure side of the valve and the exhaustion of such fluid through such outlets.

10. In a pressure-reducing valve, in combination, a casing, a reciprocating valve in the casing having a fluid-passage and coöperating with openings in the casing to control the flow of fluid from a high pressure to a low pressure, the casing having inlets leading to each end of the reciprocating valve and outlets leading from points at a distance from the ends of the valve-chamber, and a governing device actuated by the pressure from the low-pressure side of the valve, and a resisting device opposed to such pressure and controlling the admission of fluid through such inlets from the high-pressure side of the valve and the exhaustion of such fluid through such outlets to the low-pressure side of the valve.

11. A pressure-reducing valve mechanism having a high-pressure chamber and a low-pressure chamber and a valve controlling the passage of fluid from one chamber to the other and having also valve-actuating chambers located at the ends of the valve with pressure and exhaust fluid connections therefor for actuating the valve in both directions by pressure against the ends thereof, and a governing device controlled by the low-pressure fluid and controlling the connections to the valve-actuating chambers.

12. A pressure-reducing valve mechanism having a high-pressure chamber and a low-pressure chamber and a valve controlling the passage of fluid from one chamber to the other, said valve being a balanced valve, means controlled by the low pressure for actuating the valve in both directions, and means for cushioning the valve at one end, at least, of its stroke.

Signed at New York, N. Y., this 29th day of June, 1901.

JOHN B. WARING.

Witnesses:
HENRY D. WILLIAMS,
HERBERT H. GIBBS.